United States Patent
Park

(10) Patent No.: US 10,186,030 B2
(45) Date of Patent: Jan. 22, 2019

(54) APPARATUS AND METHOD FOR AVOIDING REGION OF INTEREST RE-DETECTION

(71) Applicant: SAMSUNG ELECTRONICS CO., LTD., Suwon-si (KR)

(72) Inventor: Hyoung Min Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 14/934,852

(22) Filed: Nov. 6, 2015

(65) Prior Publication Data
US 2016/0133028 A1 May 12, 2016

(30) Foreign Application Priority Data
Nov. 7, 2014 (KR) .................. 10-2014-0154693

(51) Int. Cl.
G06K 9/00 (2006.01)
G06T 7/00 (2017.01)
G06K 9/32 (2006.01)

(52) U.S. Cl.
CPC .......... *G06T 7/0012* (2013.01); *G06K 9/3233* (2013.01); *G06K 2209/05* (2013.01); *G06T 2207/10132* (2013.01); *G06T 2207/20081* (2013.01); *G06T 2207/20104* (2013.01)

(58) Field of Classification Search
None
See application file for complete search history.

(56) References Cited

U.S. PATENT DOCUMENTS

| | | | | |
|---|---|---|---|---|
| 6,058,322 A | * | 5/2000 | Nishikawa | G06T 7/0012 600/408 |
| 2002/0028006 A1 | * | 3/2002 | Novak | G06F 19/321 382/128 |
| 2004/0120561 A1 | * | 6/2004 | Goto | G06T 7/0012 382/128 |
| 2005/0102315 A1 | * | 5/2005 | Krishnan | G06T 7/0012 |
| 2008/0031504 A1 | * | 2/2008 | Worrell | G06F 19/321 382/131 |
| 2008/0221446 A1 | * | 9/2008 | Washburn | A61B 8/00 600/437 |
| 2008/0298662 A1 | * | 12/2008 | Periaswamy | G06T 7/0012 382/131 |
| 2009/0028403 A1 | * | 1/2009 | Bar-Aviv | G06F 19/321 382/128 |
| 2010/0278409 A1 | * | 11/2010 | Wiemker | A61B 6/583 382/131 |

(Continued)

OTHER PUBLICATIONS

Das et al: "Google News Personalization: Scalable Online Collaborative Filtering", WWW 2007, May 8-12, 2007, Banff, Alberta, Canada, pp. 271-280, (10 pages total).

*Primary Examiner* — Shervin Nakhjavan
(74) *Attorney, Agent, or Firm* — Sughrue Mion, PLLC

(57) ABSTRACT

According to an aspect of an exemplary embodiment, an apparatus for avoiding region of interest (ROI) re-detection includes a detector configured to detect an ROI from an input medical image; a re-detection determiner configured to determine whether the detected ROI corresponds to a previously-detected ROI using pre-stored user determination information; and an ROI processor configured to perform a process for the detected ROI based on the determination.

21 Claims, 13 Drawing Sheets

(56) References Cited

U.S. PATENT DOCUMENTS

| | | | |
|---|---|---|---|
| 2011/0002515 A1* | 1/2011 | Futami | G06F 19/321 |
| | | | 382/128 |
| 2011/0007954 A1* | 1/2011 | Suehling | G06K 9/00362 |
| | | | 382/128 |
| 2011/0123073 A1* | 5/2011 | Gustafson | G06F 19/321 |
| | | | 382/128 |
| 2011/0188722 A1* | 8/2011 | Huang | G01R 33/56 |
| | | | 382/131 |
| 2011/0191283 A1* | 8/2011 | Voigt | G06G 7/60 |
| | | | 706/54 |
| 2012/0300899 A1* | 11/2012 | Tajima | G06T 7/003 |
| | | | 378/19 |
| 2013/0006087 A1* | 1/2013 | Kondo | G06Q 50/22 |
| | | | 600/407 |
| 2013/0114867 A1* | 5/2013 | Kondo | G06F 19/321 |
| | | | 382/128 |
| 2013/0137984 A1* | 5/2013 | Takagi | A61B 8/14 |
| | | | 600/443 |
| 2014/0033081 A1 | 1/2014 | Fernandez et al. | |
| 2014/0040760 A1 | 2/2014 | Randell et al. | |
| 2014/0193051 A1* | 7/2014 | Lee | G06T 7/0012 |
| | | | 382/128 |
| 2014/0194722 A1* | 7/2014 | Lee | A61B 8/085 |
| | | | 600/407 |
| 2014/0200433 A1* | 7/2014 | Choi | A61B 5/4887 |
| | | | 600/407 |
| 2015/0026643 A1* | 1/2015 | Weese | G16H 40/63 |
| | | | 715/825 |
| 2015/0072371 A1* | 3/2015 | Marugame | G01N 33/4833 |
| | | | 435/29 |

* cited by examiner

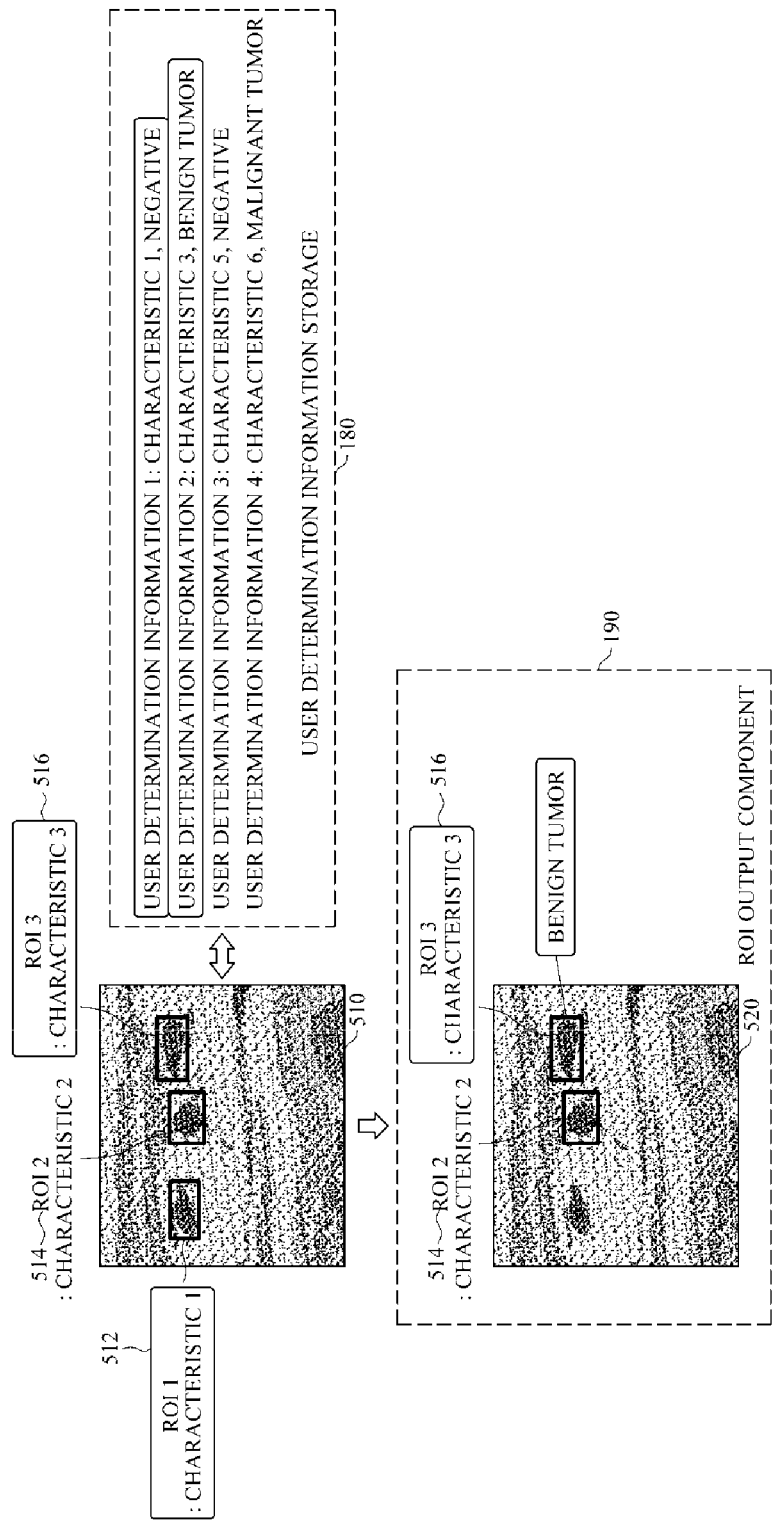

APPARATUS AND METHOD FOR AVOIDING REGION OF INTEREST RE-DETECTION

CROSS-REFERENCE TO RELATED APPLICATION(S)

This application claims benefit from Korean Patent Application No. 10-2014-0154693, filed on Nov. 7, 2014, in the Korean Intellectual Property Office, the disclosure of which is incorporated herein by reference in its entirety.

BACKGROUND

1. Field

The following description relates to an apparatus and method for avoiding ROI re-detection by acquiring and processing ROIs using medical imaging devices.

2. Description of the Related Art

Sonography is an ultrasound imaging examination that may be conducted rapidly by acquiring ultrasound images in real time without pain and radioactive rays that are harmful to the human body.

Given the characteristics of a Computer Aided Design (CAD) that supports the ultrasound examination, there may be cases where a particular tumor is redetected. Once a tumor is erroneously detected, the same tumor may be redetected, causing inconvenience to users.

Support Vector Machine (SVM) may be used as a method of separating erroneous detections. The SVM is a method for map learning, in which a separation is achieved by the hyperplane that has the largest distance to the nearest training-data point of any class.

However, even when a region of interest (ROI) is detected using the SVM in the CAD of a medical imaging device, a doctor may not determine the ROI to be a legion. In this case, if the CAD is updated by reflecting feedback from a user, erroneous classification in the CAD may be caused, thereby degrading system performance. Accordingly, when feedback is received from a user, a classification method using the SVM may affect classification results.

SUMMARY

According to an aspect of an exemplary embodiment, an apparatus for avoiding region of interest (ROI) re-detection includes a detector configured to detect an ROI from an input medical image; a re-detection determiner configured to determine whether the detected ROI corresponds to a previously-detected ROI using pre-stored user determination information; and an ROI processor configured to perform a process for the detected ROI based on the determination.

The detected ROI may corresponds to the previously-detected ROI when the detected ROI matches the previously-detected ROI, The re-detection determiner may be configured to extract characteristic information associated with the detected ROI, and determine whether the detected ROI matches the previously-detected ROI using the extracted characteristic information and the pre-stored user determination information.

The extracted characteristic information may include at least one from among a shape, a size, a margin, an echo pattern, an orientation, a boundary, and a texture.

The re-detection determiner may be configured to calculate a similarity between the extracted characteristic information and pre-stored characteristic information included in the pre-stored user determination information, and determine whether the detected ROI matches the previously-detected ROI based on the calculated similarity.

The re-detection determiner may be configured to select the pre-stored user determination information from among user determination information received from a plurality of users based on predetermined reference information, and acquire the pre-stored user determination information from a user determination information storage.

The re-detection determiner may be configured to determine a range of the pre-stored user determination information to be used, and acquire a portion of the pre-stored user determination information within the determined range from the user determination information storage.

The ROI processor may include an ROI classifier configured to classify the detected ROI when the detected ROI does not correspond to the previously-detected ROI.

The ROI processor further may include: a user feedback receiver configured to receive a user's feedback associated with the detected ROI as a user's diagnosis; and a user determination information storage configured to store user determination information that includes characteristic information associated with the detected ROI and the user's diagnosis based on the received feedback.

If the user's diagnosis differs from a classification made by an ROI classifier, the user determination information storage may be configured to store the user's diagnosis as the user determination information.

The ROI processor further may include an ROI output component, which may be configured to output the pre-stored user determination information when the detected ROI corresponds to the previously-detected ROI, and output a classification made by an ROI classifier the detected ROI does not correspond to the previously-detected ROI.

When the detected ROI corresponds to the previously-detected ROI, and a user's diagnosis included in the pre-stored user determination information indicates that the detected ROI has an abnormality, the ROI output component may be configured to output the user determination information.

According to another aspect of an exemplary embodiment, a method of avoiding region of interest (ROI) re-detection includes detecting an ROI from an input medical image; determining whether the detected ROI corresponds to a previously-detected ROI using pre-stored user determination information; and performing a process for the detected ROI based on the determination.

The method may include: extracting characteristic information associated with the detected ROI; and determining whether the detected ROI matches the previously-detected ROI using the extracted characteristic information and the pre-stored user determination information, wherein the detected ROI corresponds to the previously-detected ROI when the detected ROI matches the previously-detected ROI.

The method may include: calculating a similarity between the extracted characteristic information and pre-stored characteristic information included in the pre-stored user determination information; and determining whether the detected ROI matches the previously-detected ROI based on the calculated similarity.

The method may include: selecting the pre-stored user determination information from among user determination information received from a plurality of users based on predetermined reference information; and acquiring the pre-stored user determination information from a user determination information storage.

The method may include: determining a range of the pre-stored user determination information to be used; and acquiring a portion of the pre-stored user determination information within the determined range of the user determination information from the user determination information storage.

The performing of the process may include classifying the detected ROI when the detected ROI does not correspond to the previously-detected ROI.

The performing of the process further may include: receiving a user's feedback associated with the detected ROI as a user's diagnosis; and storing user determination information that includes characteristic information associated with the detected ROI and the user's diagnosis based on the received feedback.

If the user's diagnosis differs from a classification made by an ROI classifier, the storing of the user determination information may include storing the user's diagnosis as the user determination information.

The performing of the process may include: outputting the pre-stored user determination information when the detected ROI corresponds to the previously-detected ROI; and outputting a classification made by an ROI classifier when the detected ROI does not correspond to the previously-detected ROI.

According to yet another aspect of an exemplary embodiment, method of processing regions of interest, the method may include: detecting a first region of interest (ROI) in a first medical image; extracting first characteristic information associated with the first ROI; receiving, from a user, a diagnosis associated with the first ROI; storing the first characteristic information and the diagnosis associated with the first ROI; detecting a second ROI in a second medical image; extracting second characteristic information associated with the second ROI; determining whether the second ROI corresponds to the first ROI based on a result of a comparison between the first characteristic information and the second characteristic information; and if the second ROI is determined to correspond to the first ROI, outputting the diagnosis associated with the first ROI.

If the second ROI is determined not to correspond to the first ROI, outputting a classification result obtained from an ROI classifier.

BRIEF DESCRIPTION OF THE DRAWINGS

FIG. 5 is a diagram illustrating an example of processing a detected ROI by an ROI processor in a case where the ROI is a redetected ROI, according to an exemplary embodiment.

Figure 1:
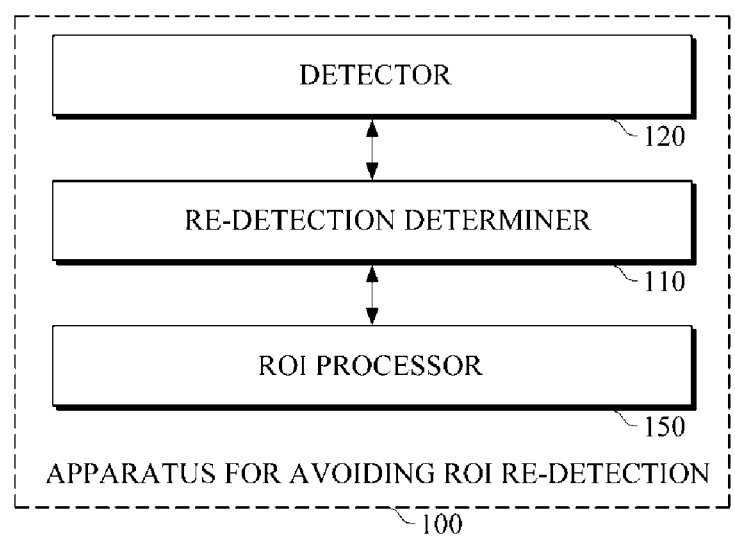
FIG. 1 is a block diagram illustrating an apparatus for avoiding region of interest (ROI) re-detection according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, embodiments of an apparatus and method for avoiding ROI re-detection will be described in detail with reference to the accompanying drawings.

FIG. 1 is a block diagram illustrating an apparatus 100 for avoiding ROI re-detection according to an exemplary embodiment. A medical imaging device using a real-time CAD may detect an ROI from an image, in which an ROI determined by a user may be redetected.

Referring to FIG. 1, the apparatus 100 for avoiding ROI re-detection includes a detector 120, a re-detection determiner 110, and an ROI processor 150.

The detector 120 receives input of a medical image and detects an ROI from the image. The medical image may be an image, such as a Magnetic Resonance Imaging (MRI) image, a digital X-ray image, or an ultrasound image, which is used for medical diagnosis. Specifically, in the case of an ultrasound image, diagnosis may be performed in real time for images input in real time, such that erroneous detection may be repeated. The apparatus 100 for avoiding ROI re-detection may prevent such erroneous detection.

Once an ROI is detected, the re-detection determiner 110 may determine whether the detected ROI is a redetected ROI by using user determination information relating to pre-stored ROIs.

The user determination information may refer to information determined and stored by a user for previously detected ROIs, and may include information on characteristics of ROIs and a user's determination, such as, for example, as malignancy, benignancy, and negative, regarding ROIs.

For example, the re-detection determiner 110 may extract information on characteristics of a detected ROI, and may compare the extracted characteristic information to characteristics of ROIs included in the user determination information, in order to determine whether characteristics of the detected ROI is identical to characteristics included in the user determination information. If the detected ROI is determined to be identical, the re-detection determiner 110 may determine the detected ROI to be a redetected ROI.

In some exemplary embodiments, the characteristics included in the user determination information may be associated with, for example, a previously-detected ROI, and determining that the detected ROI is a redetected ROI may include determining that the detected ROI corresponds to the previously-detected ROI. In further exemplary embodiments, the detected ROI may correspond to the previously-detected ROI if the detected ROI matches the previously-detected ROI. The detected ROI may be determined to match the previously-detected ROI if, for example, the characteristics associated with the ROI are identical to characteristics associated with the previously-detected ROI, or if the characteristics associated with the ROI are within a desired threshold when compared against the characteristics associated with the previously-detected ROI.

In some exemplary embodiments, methods used by the re-detection determiner 110 to determine whether two images are identical may include a method of rendering an outline, a method of dividing a detected ROI into a plurality of segments and calculating similarity between corresponding regions, a method of calculating position coordinates of a detected ROI to determine sameness.

The ROI processor 150 performs a specific process for an ROI in order to provide a re-detection determination. The specific process may include determining an ROI, outputting an ROI, receiving input of a user's feedback on a detected ROI as user's diagnosis, and storing the user's diagnosis in a user determination information storage.

In one exemplary embodiment, if a detected ROI is determined to be a redetected ROI, the ROI processor 150 may perform a process based on the user determination information. For example, the user determination information that includes the user's diagnosis may be displayed when an ROI is output. In some exemplary embodiments, if the user's diagnosis indicates that a redetected ROI is negative, which may mean that no lesion is found, the redetected ROI, which is no longer considered to be an ROI, is not output, and the redetected ROI is no longer diagnosed.

Further, if a re-detection determination provides a result that a detected ROI is not a redetected ROI, the ROI processor 150 may classify the detected ROI, and may output a result of classification. In the case of receiving feedback from a user, the received user determination information may be output prior to a classification result of the ROI processor 150. Further, the ROI processor 150 may store a user's feedback as user determination information.

Figure 2A:
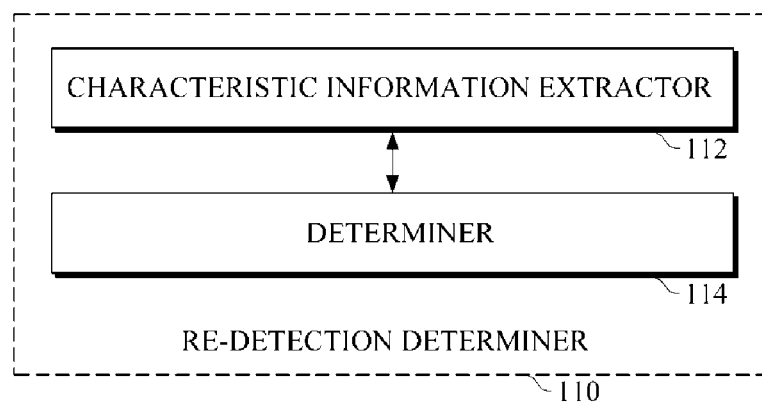
FIG. 2A is a detailed block diagram illustrating a re-detection determiner according to an exemplary embodiment.

FIG. 2A is a detailed block diagram illustrating an example of a re-detection determiner according to an exemplary embodiment. The re-detection determiner 110 includes a characteristic information extractor 112 and a determiner 114.

In one exemplary embodiment, once an ROI is detected from an image, the characteristic information extractor 112 may extract characteristic information of a detected ROI. In some exemplary embodiments, the characteristic information may be one or more of the following: a shape, a size, a margin, an echo pattern, an orientation, a boundary, and a texture.

For example, the characteristic information extractor 112 may extract, as characteristic information, information as to whether a detected ROI has a circular shape or an oval shape, a size and an orientation of a longer radius if it is of an oval shape, and the like. Further, in the case where an echo is generated, characteristic information on a pattern of the echo may be extracted, and a degree of roundness of a margin, a boundary of an ROI that is distinguished from other regions in an image, a texture, and the like may also be extracted.

The above characteristic information should be construed as one example, and other examples of extracting characteristic information from ROIs may be implemented in various manners. For example, in the case of extracting characteristic information on an ROI detected from an image acquired during an ultrasound examination, characteristic information may be extracted in consideration of characteristics of ultrasound images.

Figure 3:
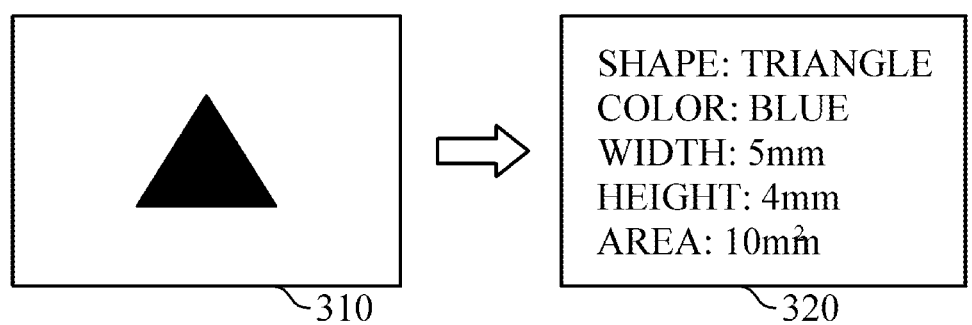
FIG. 3 is a block diagram illustrating an example of extracting characteristics of an ROI detected by a characteristic information extractor according to an exemplary embodiment.

FIG. 3 is a block diagram illustrating an example of extracting characteristics of an ROI detected by a characteristic information extractor 112 according to an exemplary embodiment. By referring to a left figure of FIG. 3, the characteristic information extractor 112 may extract characteristic information, such as shape, color, width, height, and area, of a detected ROI. Extracted characteristic information 320 may include, for example, a triangular shape, a blue color, 5 mm in width, 4 mm in height, 10 mm$^2$ in area, and the like.

By referring to FIG. 2A, the determiner 114 may determine whether a detected ROI is a redetected ROI by using the extracted characteristic information and user determination information. In one exemplary embodiment, the determiner 114 may compare the extracted characteristic information of an ROI to user determination information stored in a user determination information storage 180.

The determiner 114 may calculate a similarity between the extracted characteristics of an ROI and characteristics included in the user determination information. Further, based on the calculated similarity, the determiner 114 may determine the detected ROI, which has a similarity greater than a threshold, to be a redetected ROI that has been diagnosed previously by a user, which will be described below with reference to FIGS. 4A-4C.

Figure 4A:
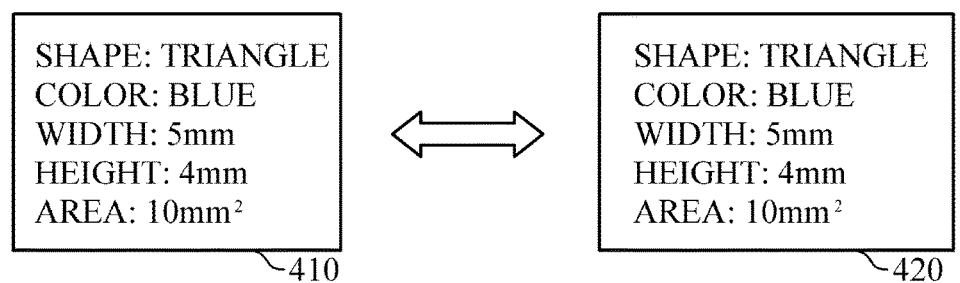
FIGS. 4A-4C are block diagrams illustrating examples of determinations made by a determiner whether a detected ROI is a redetected ROI by comparing with user determination information.
Figure 4B:
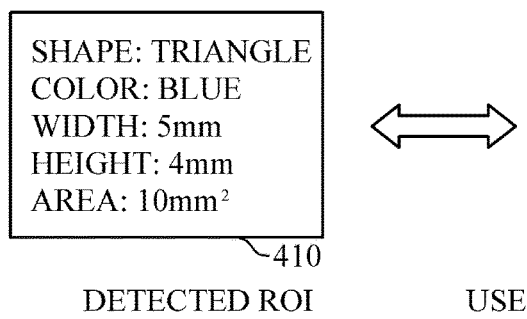
Figure 4C:
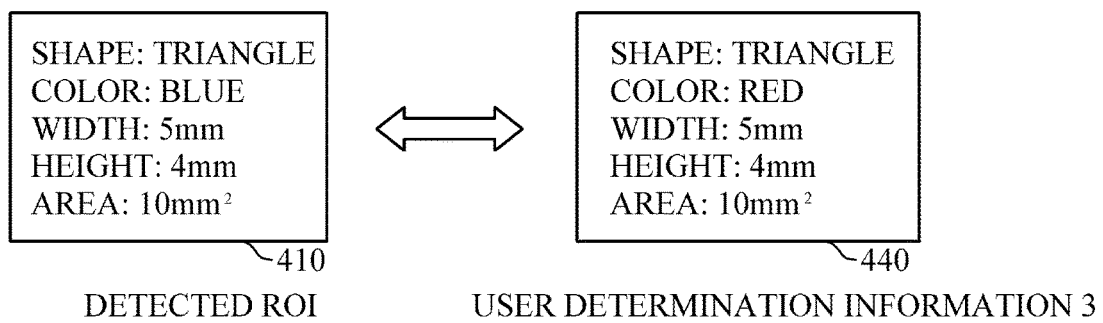

FIGS. 4A-4C are block diagrams illustrating examples of determinations made by a determiner regarding whether a detected ROI is a redetected ROI by comparing the detected ROI with user determination information.

Referring to FIG. 4A, characteristic information 410 of an ROI detected by using the CAD may be compared to user determination information 1 420. The characteristic information 410 on an ROI detected by using the CAD includes a triangular shape, a color of blue, 5 mm in width, 4 mm in height, 10 mm$^2$ in area, and the like. The characteristic information of an ROI associated with the user determination information 1 420 includes a triangular shape, a color of blue, 5 mm in width, 4 mm in height, and 10 mm$^2$ in area. By comparing the characteristic information 410 of a detected ROI to the user determination information 1 420, the determiner 114 may determine that the detected ROI is a redetected ROI, with identical characteristics in terms of shape, color, width, height, and area.

In addition to the above case where all characteristics are identical, if a degree of similarity is above a threshold, the ROI may be considered a redetected ROI that has been previously diagnosed by a user. For example, by referring to FIG. 4B, the determiner 114 may compare the ROI 410 detected by CAD to an ROI included in user determination information 2 430. Upon comparison, there are similarities between the user determination information 2 420 and characteristic information on the ROI detected by CAD in terms of a shape of triangle, a color of blue, and a width of 5 mm, but there are differences therebetween in that the user determination information 2 420 includes a height of 2 mm and an area of 10 mm$^2$, the values of which are half of the characteristic information 410 on the ROI detected by CAD. The determiner 114 may compare the characteristics of the ROI 410 detected by CAD to characteristic information included in user determination information 2 430 by calculating similarities of each type of characteristics. In this case, although there are similarities in terms of a shape, a color, and a width, there is a significant difference in sizes, such that the determiner 110 may determine that the ROI is not a redetected ROI.

Similarly, by referring to the FIG. 4C, the determiner 114 compares characteristic information 410 on an ROI detected by CAD to characteristic information included in user determination information 3 440, in which although there are similarities in terms of a shape, a width, a height, an area, and the like, but a color is different, being red instead of blue. In this case, the determiner 114 calculates a similarity which is below a threshold, although there are some similar characteristics, and may determine that the detected ROI is not a redetected ROI.

The above examples are merely illustrative, and should be construed as being an exemplary embodiment, and there may be various exemplary embodiments of calculating similarity and determining redetection.

Referring back to FIG. 2A, different determinations may be made regarding whether an ROI is identical, depending, for example, on users. Accordingly, the determiner 114 may determine user information to be used as predetermined reference information among user determination information stored for each user. The determined user information may be acquired from the user determination information storage 180.

The predetermined reference information may include information on the competency of each user, priority of each user for overwriting diagnosis results of the same ROI, the number of usage times of the user determination information, and the like.

In one exemplary embodiment, when user determination information on an ROI is input, each user may input information on their title, competency, field of expertise, and the like. Because determination of an ROI requires expertise, a user's competency may affect reliability of determination results. Accordingly, the determiner 114 may determine user determination information to be used based on predetermined information on a user's competency. For example, among doctors having the same title, a high priority may be put on user determination information input by a doctor who has excellent records in the field or who has been acknowledged for their expertise in that field.

Further, a plurality of users may store user determination information on an identical ROI. If there are many diagnosis results of one ROI, the determiner 114 may determine priority of each user based on the predetermined reference information.

In addition, based on the usage times, the determiner 114 may determine frequently used user determination information as user determination information to be used.

In another exemplary embodiment, the determiner 114 may determine a range of the user determination information to be used during a particular time period among the predetermined reference information. For example, if a real-time ultrasound image is diagnosed in real time, the determiner 114 may determine that the appropriate range of user determination information is only user determination information that is stored during the real-time diagnosis. In this case, the user determination information may be used only for the real-time diagnosis.

Moreover, the determiner 114 may determine a range of the user determination information by designating a specific body organ, for example an abdomen, liver, heart, thyroid, or any other desired body organ, which is under an ultrasound examination, and may determine to use only the user determination information for the designated body organ.

According to the progress of an examination, the determiner 114 may also determine to use user determination information that has been input after a specific period of time among stored user determination information. In a case where one user has input many types of user determination information, the determiner 114 may determine user determination information to be used differently depending on each examination.

The determiner 114 may acquire, from the user determination information storage, user determination information which is within the determined scope of using determination information. In addition to the above exemplary embodiments, the reference information may be applied in various manners, such that the present disclosure is not limited to the above exemplary embodiments.

Figure 2B:
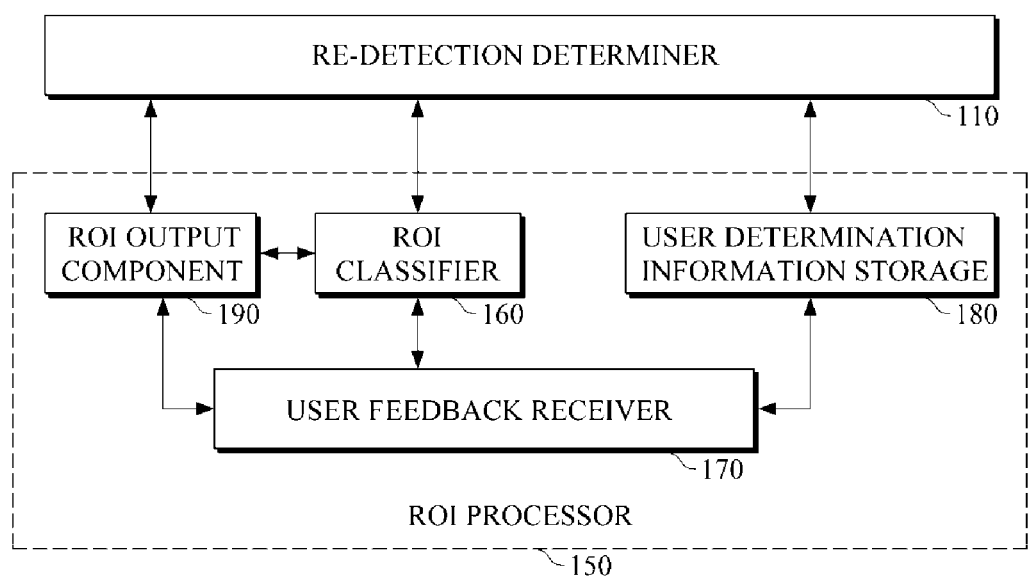
FIG. 2B is a detailed block diagram illustrating an ROI processor according to an exemplary embodiment.

FIG. 2B is a detailed block diagram illustrating an example of an ROI processor 150 according to an exemplary embodiment.

The ROI processor 150 performs a specific process for an ROI based on determination made by the re-detection determiner 110. Referring to FIG. 2B, the ROI processor 150 includes an ROI classifier 160, a user feedback receiver 170, a user determination information storage 180, and an ROI output component 190.

In the case where an ROI detected by CAD is not a redetected ROI according to a re-detection determination, the ROI classifier 160 may classify the detected ROI.

In one exemplary embodiment, by using characteristic information of the detected ROI, the ROI classifier 160 may classify the detected ROI according to a malignancy or benignancy probability, a degree of risk based on the probability, interest levels, and the like. In some exemplary embodiments, the interest levels may be separated into negative, alert, dangerous regions, and the like, or may be separated in further detail.

The user feedback receiver 170 may receive a user's feedback that includes a user's diagnosis of an ROI detected by CAD. The user feedback receiver 170 may provide the user's diagnosis to the user determination information storage 180.

Further, the user feedback receiver 170 may perform determination on a detected ROI and may receive a user's feedback on the determination.

The user determination information storage 180 may store or update user determination information received from the user feedback receiver 170. In this case, the user determination information storage 180 may store information received from each user as user determination information that includes characteristics of the detected ROI. Further, the user determination information storage 180 may include a tag or metadata in user determination information so that the stored user determination information may be easily retrieved.

In one exemplary embodiment, the user determination information storage 180 may store predetermined reference information to be used as user determination information among user determination information received from a plurality of users. The reference information may include information on the competency of each user, priority of each user for overwriting diagnosis results of the same ROI, the number of usage times for determination information, and the like.

In this case, without being limited to the ROI processor 150, the user determination information storage 180 may be included in a database, a management server, or in an external storage.

In the case where a detected ROI is a redetected ROI, the ROI output component 190 may determine whether to output the detected ROI based on the user determination information that includes user's diagnosis.

For example, if the user's diagnosis included in the user determination information indicates that a redetected ROI is negative, the ROI processor 150 may process the redetected ROI so that the ROI may not be detected again, considering that the redetected ROI is no longer an ROI, and based on the process, the ROI output component 190 may not output the redetected ROI.

In another example, in the case where a redetected ROI is determined to be benign or malignant based on the user determination information that includes user's diagnosis of the redetected ROI, the ROI output component 190 may output the detected ROI with the user determination information that includes user's diagnosis, and may provide the information to a user, which will be described in detail below with reference to FIG. 5.

The above example should be construed as being an exemplary embodiment, and the ROI output component 190 may output not only the user determination information that includes user's diagnosis, such as malignancy, benignancy, and negative, regarding ROIs, but also details in addition to the user's diagnosis, or may provide a user with an input window to receive feedback from the user.

In yet another example, in the case where a detected ROI is not a redetected ROI, the ROI output component 190 may output a result of classification made by the ROI classifier 160. However, even when classification on the detected ROI is made by the ROI classifier 160, in the case where the user determination information is input from the user feedback receiver 170, the ROI output component 190 may output the received user determination information prior to the result of classification made by the ROI classifier 160. Hereinafter, the case where the ROI is a redetected ROI and the case where the ROI is not a redetected ROI will be described in detail with reference to FIGS. 5 and 6.

FIG. 5 is a diagram illustrating an example of processing a detected ROI by an ROI processor in the case where the ROI is a redetected ROI.

By taking an ultrasound image as an example, and referring to FIGS. 2B and 5, there are three ROIs 512, 514, and 516 which are detected from an ultrasound image 510. In one exemplary embodiment, the detected ROI 512 has characteristic 1, the detected ROI 514 has characteristic 2, and the detected ROI 516 has characteristic 3. The re-detection determiner 110 may compare the characteristics 1, 2, and 3 to each user determination information stored in the user determination information storage 180. Referring to FIG. 5, the re-detection determiner 110 may determine that the characteristic 1 of the ROI 1 512 detected from the ultrasound image 510 to be identical to the characteristic 1 of the user determination information 1, and the characteristic 3 of the ROI 3 516 detected from the ultrasound image 510 to be identical to the characteristic 3 of the user determination information 2. Based on the determination, the re-detection determiner 110 may determine that the detected ROIs 1 and 3 are redetected ROIs. The ROI processor 150 performs a specific process for the ROIs, and may determine whether to output the ROI 1 512 and ROI 3 516, which are determined to be redetected ROIs, based on the user determination information stored in the user determination information storage 180.

For example, in the case where the user determination information 1 regarding the ROI 1 512 indicates that the detected ROI 1 512 is negative, the ROI output component 190 may not output the detected ROI 1 512, and the ROI processor 150 may process the ROI 1 512 so that the ROI 1 512 may not be detected again, because the detected ROI, which is a redetected ROI, is negative.

Further, in the case where the user determination information 2 regarding the ROI 3 516 indicates that the ROI 3 516 is a benign tumor, the ROI processor 150 may output the user determination information along with user's diagnosis that the ROI detected by the ROI output component 190 is a benign tumor.

With no identical characteristics found upon comparing the ROI 2 514 to user determination information, the re-detection determiner 110 may determine that the ROI 2 514 is not a redetected ROI. The ROI 2 514 that is not a redetected ROI will be described below with reference to FIG. 6.

Figure 6:
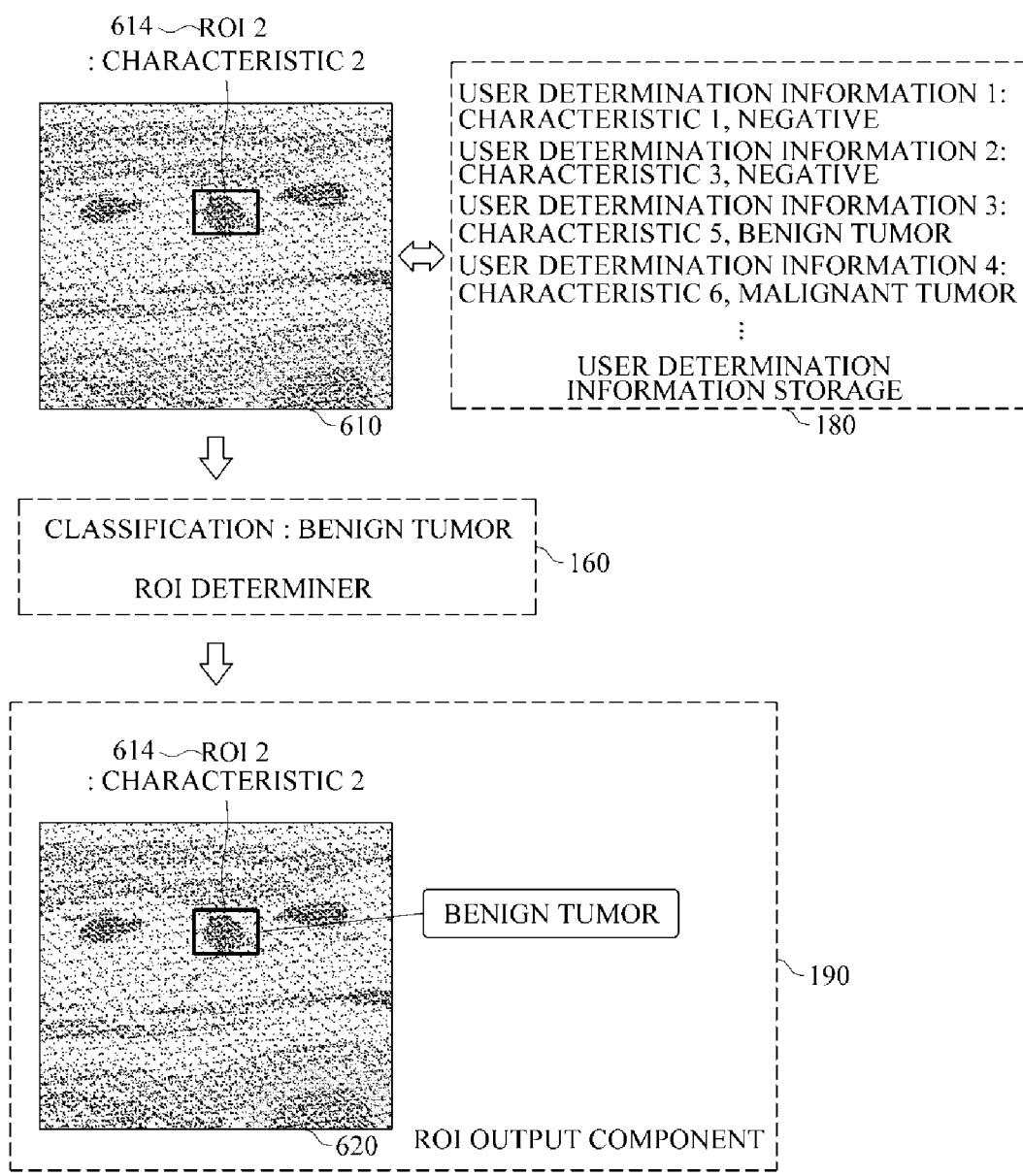
FIG. 6 is a diagram illustrating an example of processing a detected ROI by an ROI processor in a case where the ROI is not a redetected ROI, according to an exemplary embodiment.

FIG. 6 is a diagram illustrating an example of processing a detected ROI by an ROI processor 150 in the case where the ROI is not a redetected ROI. Referring to FIGS. 2(B) and 6, the re-detection determiner 110 compares characteristics of the ROI 2 614 detected from an ultrasound image 610 to user determination information stored in the user determination information storage 180. Because there is no characteristic 2 in user determination information 1, 2, 3, 4, . . . stored in the user determination information storage 180, the re-detection determiner 110 determines that the detected ROI 2 614 is not a redetected ROI.

In the case where the detected ROI is not a redetected ROI, the ROI processor 150 classifies an ROI 2 614 detected from the ROI classifier 160. Classification of an ROI based on an image is commonly known in the art, such that detailed descriptions thereof will be omitted.

In the case where the ROI classifier 160 classifies that the ROI 2 614, which is not a redetected ROI, is a benign tumor, the ROI output component 190 may output the result of classification made by the ROI classifier 160 along with the detected ROI.

Figure 7:
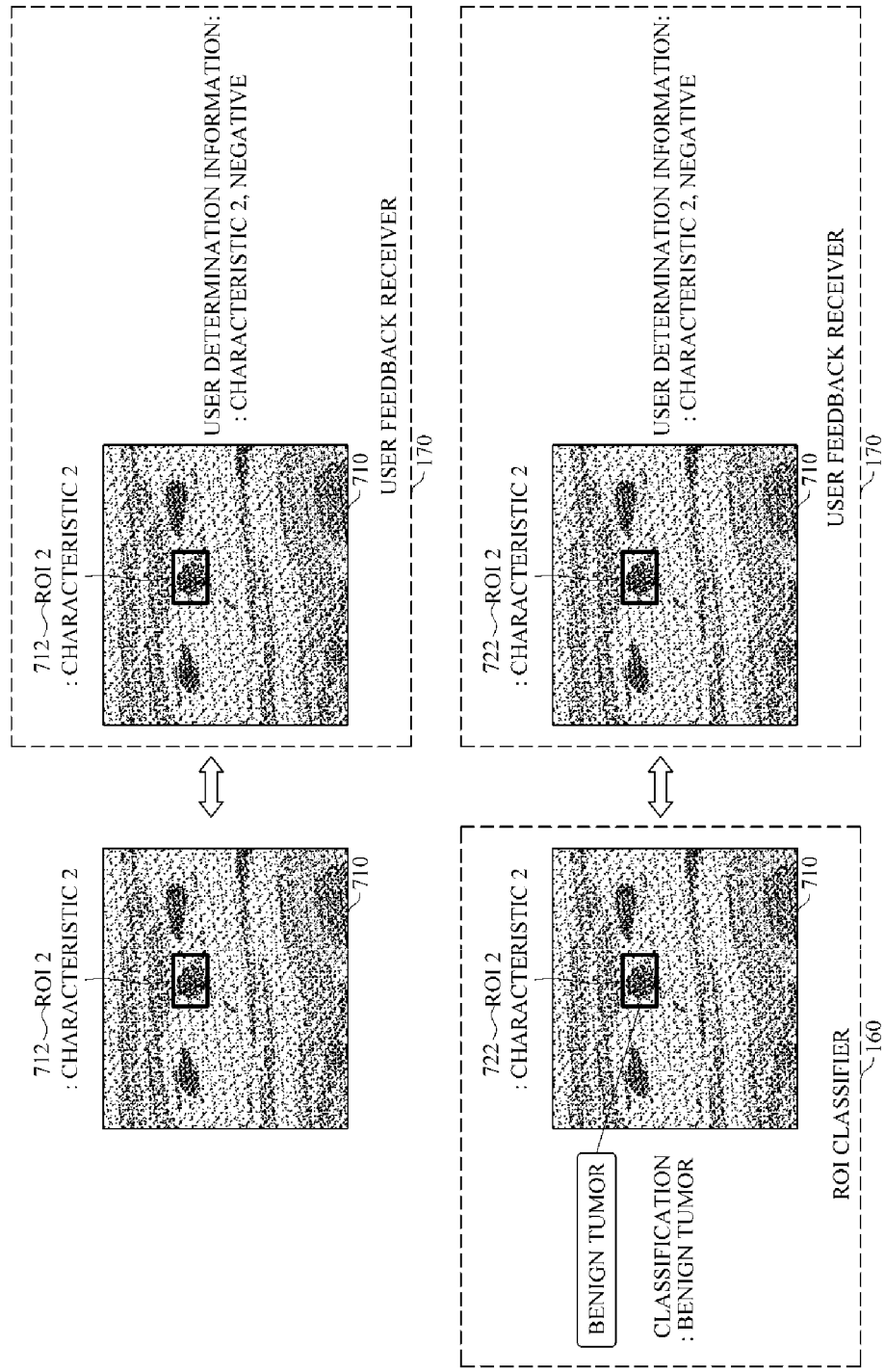
FIG. 7 is a diagram illustrating an example of receiving, by a user feedback receiver, a user's feedback on a detected or determined ROI.

FIG. 7 is a diagram illustrating an example of receiving, by a user feedback receiver 170, a user's feedback on a detected ROI or a classified ROI. Referring to FIGS. 2B and 7, the user feedback receiver 170 may receive a user's feedback on characteristic information on a detected ROI, and may receive user determination information that includes the characteristic information and a user's diagnosis.

Referring to the upper figure of FIG. 7, the re-detection determiner 110 detects an ROI 2 712 from an ultrasound image 710, and extracts a characteristic 2 as characteristic information. In this case, the user feedback receiver 170 may receive, from a user, a classification result that the detected ROI 2 712 is negative. The received classification result may be stored in the user determination information storage 180.

Further, the user feedback receiver 170 may receive a user's diagnosis on the ROI 2 even after classification has been made by the ROI classifier 160.

Referring to the embodiment of the lower figure of FIG. 7, the ROI classifier 160 has classified that the detected ROI 2 722 is a benign tumor, but a user may input different diagnosis thereon. The user feedback receiver 170 may receive a user's diagnosis that the ROI 2 722 detected from the ultrasound image 720 is negative. In the case where the classification made by the ROI classifier 160 is not identical to a user's diagnosis, the ROI processor 150 may process the ROI according to the user's diagnosis.

Figure 8:
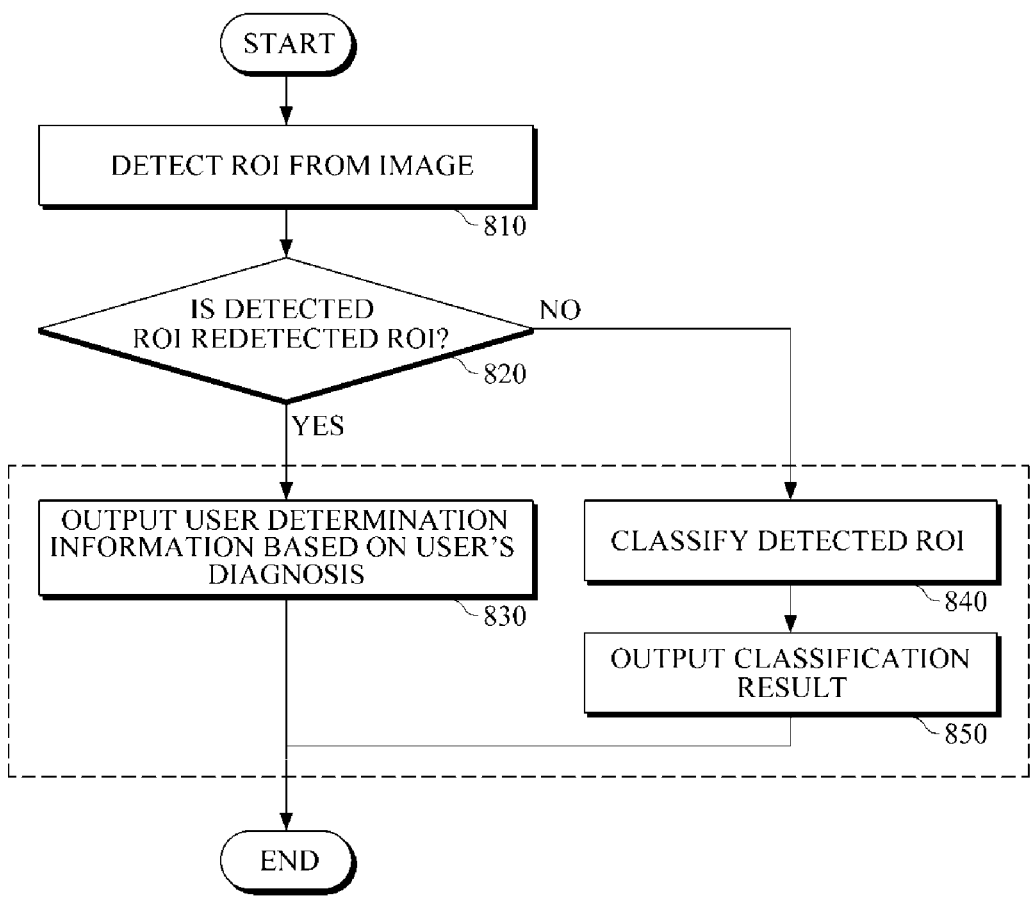
FIG. 8 is a flowchart illustrating a method of avoiding ROI re-detection by using the apparatus for avoiding ROI re-detection, according to an exemplary embodiment.

FIG. 8 is a flowchart illustrating a method of avoiding ROI re-detection by using the apparatus 100 for avoiding ROI re-detection. Hereinafter, a method of avoiding ROI re-detection will be described with reference to FIG. 8.

First, the apparatus 100 for avoiding ROI re-detection detects an ROI from an input medical image in 810.

Then, upon detecting the ROI, it is determined whether the detected ROI is a redetected ROI by using pre-stored user determined information on ROIs in 820. The apparatus 100 for avoiding ROI re-detection extracts specific characteristic information on the detected ROI to determine whether the detected ROI is a redetected ROI based on the extracted characteristic information and user determination information.

For example, by comparing the extracted characteristic information and ROI characteristic information included in the user determination information, the apparatus 100 may determine whether the detected ROIs are identical to the user determination information. In some exemplary embodiments, methods of determining whether ROIs are identical may include, but are not limited to, a method of rendering an outline, a method of dividing a detected ROI into a plurality of segments and calculating similarity between corresponding regions, a method of calculating position coordinates of a detected ROI to determine sameness.

Subsequently, the apparatus 100 for avoiding ROI re-detection may perform a specific process according to the determination. The specific process may include classification of an ROI, output of an ROI, and the like, and may further include receiving a user's feedback and storing user determination information.

In the case where the detected ROI is a redetected ROI in 820, the apparatus 100 for avoiding ROI re-detection may output user determination information based on the user determination information that includes a user's diagnosis in 830.

Further, in the case where the detected ROI is not a redetected ROI in 820, the apparatus 100 for avoiding ROI re-detection may perform classification of the detected ROI in 840, and may output the classification result in 850.

Figure 9:
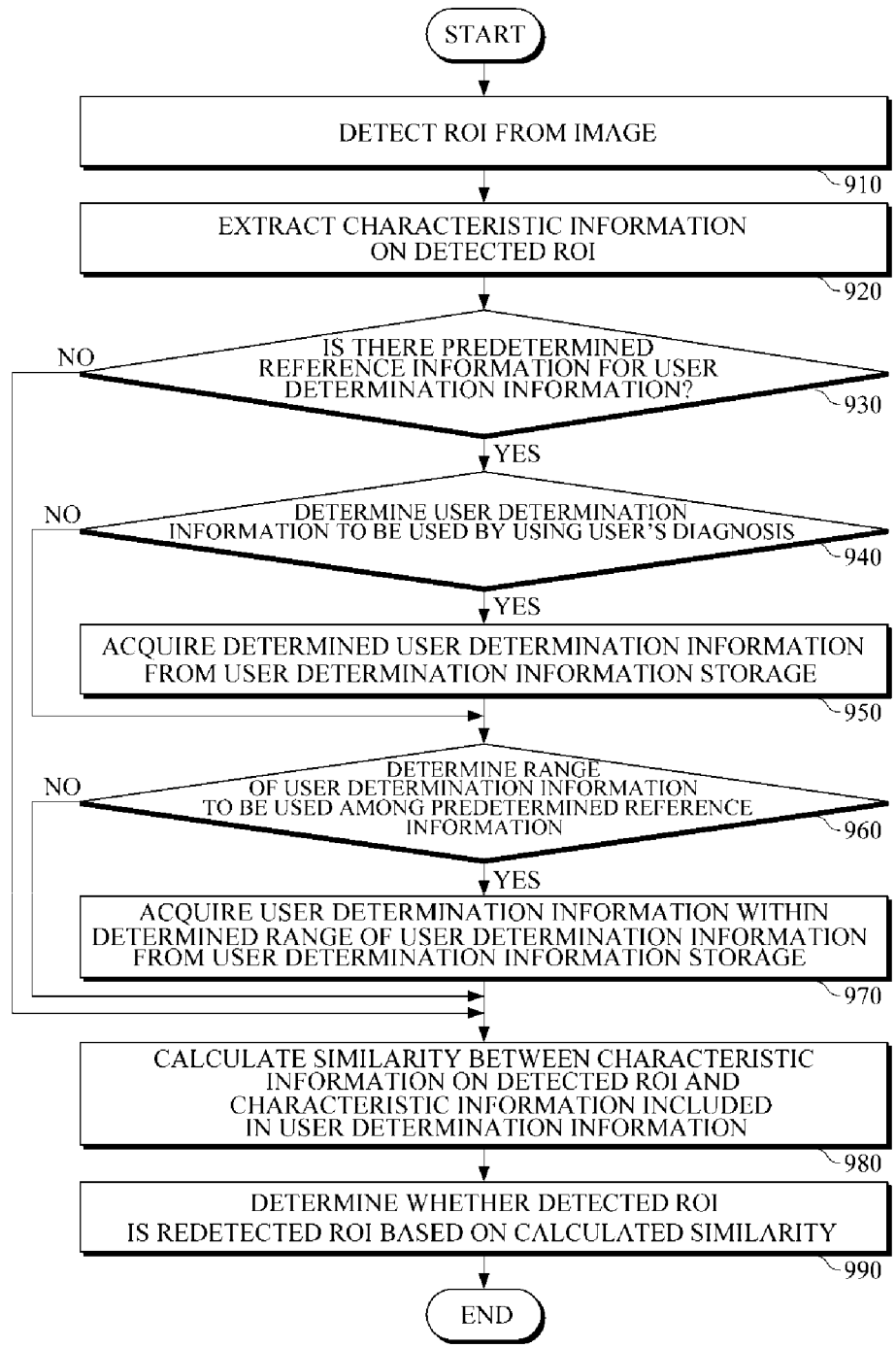
FIG. 9 is a flowchart illustrating an example of determining by a re-detection determiner whether a detected ROI is a redetected ROI according to an exemplary embodiment.

FIG. 9 is a flowchart illustrating an example of determining by a re-detection determiner 110 whether a detected ROI is a redetected ROI according to an exemplary embodiment. Referring to FIG. 9, the method of avoiding ROI re-detection may include determining whether a detected ROI is a redetected ROI and determining user determination information to be used based on predetermined reference information.

First, once an ROI is detected from an image in 910, the re-detection determiner 110 may extract characteristic information on the detected ROI in 920. The characteristic information may include one or more of the following: a shape, a size, a margin, an echo pattern, an orientation, a boundary, and a texture.

For example, the re-detection determiner 110 may extract, as characteristic information, information as to whether a detected ROI has a circular shape or an oval shape, a size and an orientation of a longer radius if it is of an oval shape, and the like. Further, in the case where an echo is generated, characteristic information on a pattern of the echo may be extracted, and a degree of roundness of a margin, a boundary of an ROI that is distinguished from other regions in an image, a texture, and the like may also be extracted.

User's diagnosis of an identical ROI detected by CAD may be different depending on users. Accordingly, the re-detection determiner 1010 may determine user determination information to be used based on user information that is predetermined reference information among user determination information received from a plurality of users.

In this case, the re-detection determiner 110 determines whether there is predetermined reference information for user determination information. The predetermined reference may include information on the competency of each user, priority of each user for overwriting diagnosis results of the same ROI, the number of usage times of user determination information, and the like.

In one exemplary embodiment, when user determination information on an ROI is input, each user may input information on their competency, such as their title, work experience, field of expertise, and the like. Because determination of an ROI requires expert knowledge, a user's competency may affect reliability of determination results. Accordingly, the re-detection determiner 114 may determine user determination information to be used based on predetermined information on a user's competency.

For example, among doctors having the same title, a high priority may be put on user determination information input by a doctor who has excellent records in the field or who has been acknowledged for their expertise in that field.

Further, a plurality of users may store diagnosis results on an identical ROI. If there is a plurality of diagnosis results of one ROI, the re-detection determiner 114 may determine priority of each user for overwriting diagnosis results of the same ROI based on predetermined reference information.

In addition, based on the number of usage times of user determination information, the re-detection determiner 114 may determine frequently used user determination information as user determination information to be used.

In the case where there is predetermined reference information in 930, user determination information to be used may be determined in 940 by using user's diagnosis. In addition, the determined user determination information may be acquired from the user determination information storage 180 in 950.

Further, the re-detection determiner 110 may determine a range of the user determination information to be used among the predetermined reference information in 940 and 960. For example, if a real-time ultrasound image is diagnosed in real time, the determiner 114 may determine a range of appropriate user determination information as only user determination information that is stored during the real-time diagnosis. In this case, the user determination information may be used only for the real-time diagnosis.

Moreover, the re-detection determiner 110 may designate a specific body organ (e.g., abdomen, liver, heart, thyroid, etc.), which is under an ultrasound examination, and may determine to use only the user determination information on the designated body organ.

According to the progress of an examination, the determiner 114 may also determine to use user determination information that has been input after a specific period of time among stored user determination information. In the case where one user has input many types of user determination information, the determiner 114 may determine user determination information to be used differently depending on each examination.

The re-detection determiner 110 may determine a range of the user determination information to be used from the predetermined reference information, and may receive, from the user determination information storage, user determination information which is within the determined range of the user determination information.

In the case where there is no predetermined reference information in 930, in the case where user determination information to be used is not determined based on user's diagnosis in 940, or in the case where a range of the user determination information to be used among the predetermined reference information is not determined in 960, the next operation is performed. In addition to the above exemplary embodiments, the reference information may be applied in various manners, such that the present disclosure is not limited to the above exemplary embodiments.

The re-detection determiner 110 may determine whether an ROI is a redetected ROI by using extracted characteristic information and user determination information. In one exemplary embodiment, the re-detection determiner 110 may calculate similarity between characteristic information extracted from a detected ROI and characteristic information included in the user determination information in 980.

Subsequently, based on the calculated similarity, it may be determined that an ROI having a similarity greater than a threshold is a redetected ROI, considering that the ROI has been previously diagnosed by a user in 990.

Figure 10:
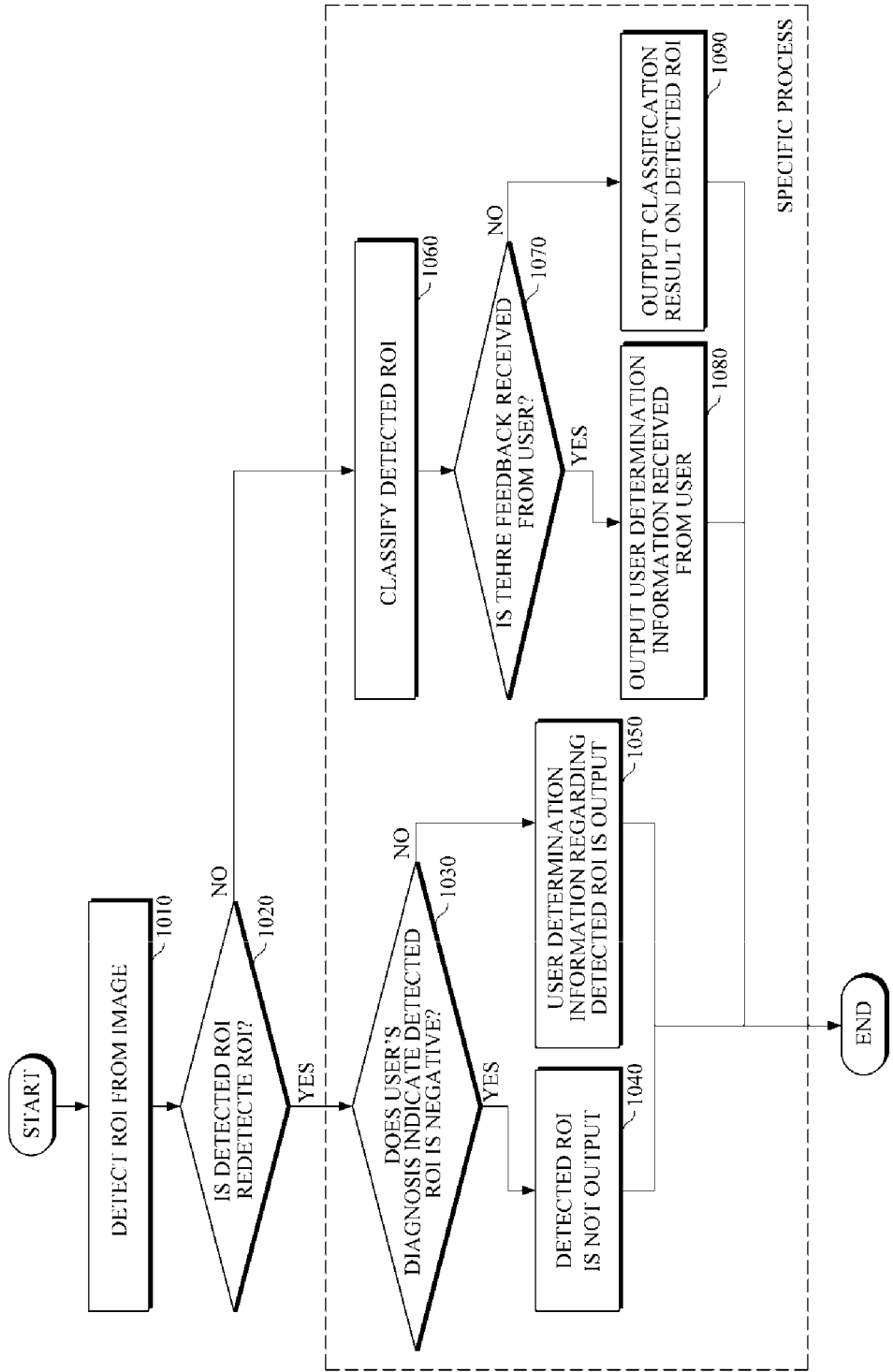
FIG. 10 is a flowchart illustrating an example of performing a specific process by the ROI processor based on a redetection determination.

FIG. 10 is a flowchart illustrating an example of performing a process by the ROI processor 150 based on a redetection determination.

First, the ROI processor 150 detects an ROI from an image in 1010.

Then, once an ROI is detected, it is determined whether the detected ROI is a redetected ROI in 1020. Processing an ROI in the case where an ROI is a redetected ROI and in the case where the ROI is not a redetected ROI will be described below.

In the case where an ROI is a redetected ROI in 1020, the ROI processor 150 may determine whether to output the ROI based on a user's diagnosis included in the user determination information.

For example, the ROI processor 150 may determine whether the user's diagnosis included in the user determination information indicates that a redetected ROI is negative in 1030. In the case where the user's diagnosis included in the user determination information indicates that a redetected ROI is negative, the ROI processor 150 may process the ROI so that the ROI may not be output in 1040, considering that the redetected ROI is no longer an ROI.

In the case where the user's diagnosis included in the user determination information indicates that a redetected ROI is not negative, the user determination information regarding the redetected ROI may be output in 1050. For example, in the case where the user's diagnosis included in the user determination information indicates that the redetected ROI is a benign tumor, the apparatus 100 for avoiding ROI re-detection may output the user determination information along with the user's diagnosis that the ROI is a benign tumor.

In some exemplary embodiments, in the case where the detected ROI is not a redetected ROI in 1020, the ROI processor 150 may classify the detected ROI in 1060.

Then, it is determined whether to receive a user's feedback on the classification result in 1070. In the case where there is no feedback from a user in 1070, the ROI processor 150 may output classification result on the detected ROI in 1090.

In the case of receiving feedback from a user in 1070, the ROI processor 150 may output user determination information input from a user in 1080. In this case, if classification of an ROI made by CAD is not identical to a user's diagnosis, the ROI processor 150 may process the ROI based on the user's diagnosis. The user's diagnosis may be stored in the user determination information storage or may be updated.

Information received from each user may be stored as user determination information that includes characteristics of detected ROIs. A tag or metadata may be included in the user determination information so that the stored user determination information may be easily retrieved. In one exemplary embodiment, predetermined reference information may be stored, so that based on the reference information, user determination information to be used to determine whether a detected ROI is a redetected ROI may be determined from among user determination information received from a plurality of users. The reference information may include information on the competency of each user that inputs feedback, statistics on each user's diagnosis, the number of usage times of the user determination information, priority of each user for overwriting diagnosis results of the same ROI.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for avoiding region of interest (ROI) re-detection, the apparatus comprising:
a storage; and
at least one processor configured to:
detect an ROI from an input medical image,
determine whether the detected ROI corresponds to a previously-detected ROI included in pre-stored user determination information, and
in response to determining that the detected ROI corresponds to the previously-detected ROI, determine whether the detected ROI includes a benign tumor or a malignant tumor; and in response to determining that the detected ROI includes the benign tumor or the malignant tumor, output the previously stored user determination information, wherein the pre-stored user determination information includes a previous diagnosis of the previously-detected ROI made by a user, and wherein the previous diagnosis of the previously-detected ROI is inputted by the user before the input medical image is inputted.

2. The apparatus of claim 1, wherein:
the processor is configured to extract characteristic information associated with the detected ROI, and determine whether the detected ROI matches the previously-detected ROI using the extracted characteristic information and the pre-stored user determination information.

3. The apparatus of claim 2, wherein the extracted characteristic information includes at least one from among a shape, a size, a margin, an echo pattern, an orientation, a boundary, and a texture.

4. The apparatus of claim 2, wherein the processor is further configured to calculate a similarity between the extracted characteristic information and pre-stored characteristic information included in the pre-stored user determination information, and determine whether the detected ROI matches the previously-detected ROI based on the calculated similarity.

5. The apparatus of claim 1, wherein the processor is further configured to select the pre-stored user determination information to be used from among user determination information received from a plurality of users based on predetermined reference information, and acquire the pre-stored user determination information from the storage.

6. The apparatus of claim 5, wherein the processor is further configured to determine a range of the pre-stored user determination information to be used, and acquire a portion of the pre-stored user determination information within the determined range from the storage.

7. The apparatus of claim 1, wherein the processor is further configured to classify the detected ROI when the detected ROI does not correspond to the previously-detected ROI.

8. The apparatus of claim 1, wherein the processor is further configured to:
receive a user's feedback associated with the detected ROI as a user's diagnosis; and
store in the storage user determination information that includes characteristic information associated with the detected ROI and the user's diagnosis based on the received feedback.

9. The apparatus of claim 8, wherein if the user's diagnosis differs from a classification made by an ROI classifier, the processor is further configured to store the user's diagnosis as the user determination information in the storage.

10. The apparatus of claim 1, wherein in response to the processor determining that the detected ROI does not correspond to the previously-detected ROI, the process comprises outputting a classification made by an ROI classifier.

11. The apparatus of claim 10, wherein when the detected ROI corresponds to the previously-detected ROI, and a user's diagnosis included in the pre-stored user determination information indicates that the detected ROI has an abnormality, the processor is further configured to output the user determination information.

12. The apparatus of claim 1, wherein, if the pre-stored user determination information includes an indication that a lesion was not found in the previously-detected ROI, the processor is further configured to not output the pre-stored user determination information.

13. A method of avoiding region of interest (ROI) re-detection, the method comprising:
detecting, using at least one processor, an ROI from an input medical image;
determining, using the at least one processor, whether the detected ROI corresponds to a previously-detected ROI included in pre-stored user determination information; and
in response to determining that the detected ROI corresponds to the previously-detected ROI, determining whether the detected ROI includes a benign tumor or a malignant tumor; and
in response to determining that the detected ROI includes the benign tumor or the malignant tumor, outputting the pre-stored user determination information,
wherein the pre-stored user determination information includes a previous diagnosis of the previously-detected ROI made by a user,
wherein the previous diagnosis of the previously-detected ROI is inputted by the user before the input medical image is inputted.

14. The method of claim 13, wherein determining whether the detected ROI corresponds to the previously-detected ROI using pre-stored user determination information comprising:
extracting characteristic information associated with the detected ROI; and
determining whether the detected ROI matches the previously-detected ROI using the extracted characteristic information and the pre-stored user determination information.

15. The method of claim 14, further comprising:
calculating a similarity between the extracted characteristic information and pre-stored characteristic information included in the pre-stored user determination information; and
determining whether the detected ROI matches the previously-detected ROI based on the calculated similarity.

16. The method of claim 13, further comprising:
selecting the pre-stored user determination information from among user determination information received from a plurality of users based on predetermined reference information; and
acquiring the pre-stored user determination information from a user determination information storage.

17. The method of claim 13, further comprising:
determining a range of the pre-stored user determination information to be used; and
acquiring a portion of the pre-stored user determination information within the determined range of the user determination information from a user determination information storage.

18. The method of claim 13, further comprising classifying the detected ROI when the detected ROI does not correspond to the previously-detected ROI.

19. The method of claim 13, further comprising:
receiving a user's feedback associated with the detected ROI as a user's diagnosis; and
storing user determination information that includes characteristic information associated with the detected ROI and the user's diagnosis based on the received feedback.

20. The method of claim 19, if the user's diagnosis differs from a classification made by an ROI classifier, the storing of the user determination information comprises storing the user's diagnosis as the user determination information.

21. The method of claim 13, wherein in response to the determination indicating that the detected ROI does not correspond to the previously-detected ROI, the method further comprises outputting a classification made by an ROI classifier.

\* \* \* \* \*